United States Patent
Houchin et al.

[11] Patent Number: 5,835,637
[45] Date of Patent: Nov. 10, 1998

[54] METHOD AND APPARATUS FOR SHARPENING AN IMAGE BY SCALING SPATIAL RESIDUAL COMPONENTS DURING IMAGE RECONSTRUCTION

[75] Inventors: J. Scott Houchin; Michael Stuart Axman, both of Rochester, N.Y.

[73] Assignee: Eastman Kodak Company, Rochester, N.Y.

[21] Appl. No.: 407,532

[22] Filed: Mar. 20, 1995

[51] Int. Cl.⁶ .................................................. G06K 9/40
[52] U.S. Cl. ........................ 382/254; 382/233; 358/447
[58] Field of Search .................... 382/233, 235, 382/240, 263, 254, 260; 358/447, 432, 448, 428, 427; 364/724.05, 724.06, 724.08, 724.19

[56] References Cited

U.S. PATENT DOCUMENTS

| | | |
|---|---|---|
| 4,709,394 | 11/1987 | Bessler et al. . |
| 4,969,204 | 11/1990 | Melynchuck et al. . |
| 5,020,120 | 5/1991 | Weldy . |
| 5,025,325 | 6/1991 | Hudson . |
| 5,048,111 | 9/1991 | Jones et al. . |
| 5,050,230 | 9/1991 | Jones et al. . |
| 5,122,873 | 6/1992 | Golin . |
| 5,210,623 | 5/1993 | Weldy . |
| 5,218,435 | 6/1993 | Lim et al. . |
| 5,227,789 | 7/1993 | Barry et al. . |
| 5,253,053 | 10/1993 | Chu ............................. 382/233 |
| 5,272,543 | 12/1993 | Yanagisawa . |
| 5,374,995 | 12/1994 | Loveridge et al. . |
| 5,381,526 | 1/1995 | Ellson . |
| 5,390,264 | 2/1995 | Ishihara ...................... 382/266 |
| 5,524,162 | 6/1996 | Levien ........................ 382/263 |

*Primary Examiner*—Dwayne D. Bost
*Assistant Examiner*—Brian L. Johnson
*Attorney, Agent, or Firm*—J. Randall Beckers

[57] ABSTRACT

A system that sharpens an image by scaling high frequency residual components of an image stored in decomposed base and residual format. The scaling of the residuals is performed as a high resolution image is being reconstructed from the base and residual images. The scaling is combined with residual decompression into a single table look-up operation.

11 Claims, 7 Drawing Sheets

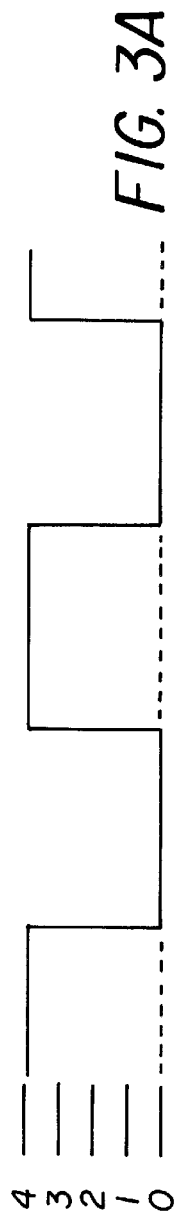
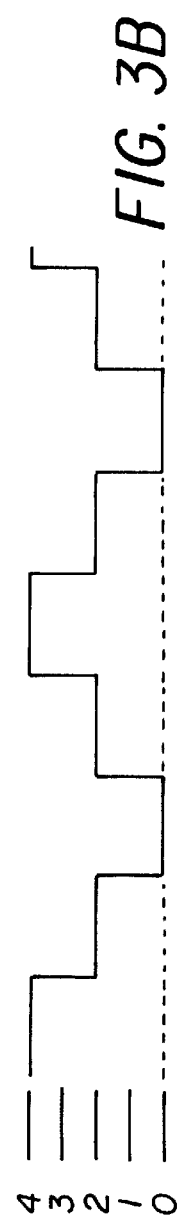
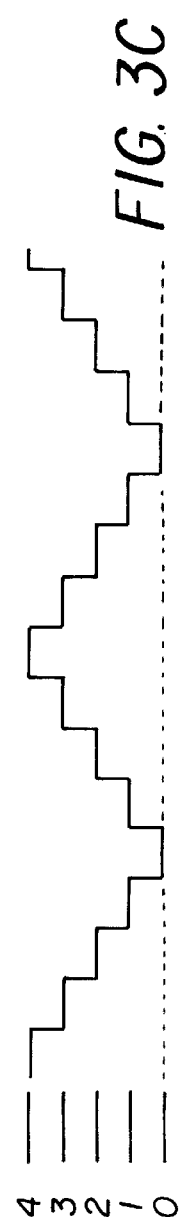

RESIDUAL

RESIDUAL
SCALED
BY 2

SHARPENED IMAGE
(ORIGINAL + SCALED RES.)

METHOD AND APPARATUS FOR SHARPENING AN IMAGE BY SCALING SPATIAL RESIDUAL COMPONENTS DURING IMAGE RECONSTRUCTION

BACKGROUND OF THE INVENTION

1. Field of the Invention

The present invention is directed to performing sharpening of an image during image reconstruction and, more particularly, to a system in which image residuals are scaled during a table look-up operation that performs image residual component decompression.

2. Description of the Related Art

An image may need to be sharpened for many reasons. It may be necessary to compensate for future loss when displayed on a real device, or to restore an image after being acquired from a real device. Once the image is in the digital domain, the prior art uses convolution with a Finite Impulse Response (FIR) filter to perform sharpening. This is a very computationally intensive process, requiring many multiplication operations for every pixel in the image. The filter is designed to boost the part of the image that represents the high frequency information. To do this, the filter must isolate the high frequency information from the low frequency information. In storing images in digital form it is often the case that the images are compressed in some fashion to reduce the amount of storage space required for the images. One technique which is used in the storage of images on a CD ROM is to form a multi-level quantized digital image signal. This format includes a base image at a low resolution and one or more residual images that are combined with the base image to reconstruct higher resolution versions of the image. This technique is found in the Photo CD™ product available from Eastman Kodak Co. and is described in various U.S. patents including: U.S. Pat. Nos. 4,969,204; 5,048,111; 5,050,230; 5,020,120; 5,210,623 and 5,227,789. For a Photo CD™ image, the isolation of the high frequency information of the image has already been done by the decomposition process. The individual image component residuals at the various levels (for example, the 4 Base and 16 Base levels) represent bands of frequency information at frequencies progressively higher than the Base image. To conventionally sharpen an image stored in the above-discussed format, the image is reconstructed and the reconstructed image is filtered to sharpen it. This is a time consuming and computationally intensive series of operations.

What is needed is a way to boost the high frequency information provided by the decomposed images as the images are being reconstructed resulting in a sharpening of the image without the need for re-separating the high frequency information from the reconstructed images.

SUMMARY OF THE INVENTION

It is an object of the present invention to provide a system for boosting the high frequency residual components of an image in a residual decomposition format during image reconstruction.

It is another object of the present invention to perform sharpening of an image without requiring any operations in addition to those normally performed during image reconstruction.

It is an additional object of the present invention to perform a simple scaling operation to sharpen an image.

The above objects can be attained by a system that scales high frequency residual components of an image stored in base and residual format as a high resolution image is being constructed from the base and residual images. The scaling is typically a nonlinear type of scaling. The table look-up operation used in decompression of the image residuals is combined with the scaling operation to provide a single table that performs both steps at the same time. This results in the sharpening operation adding no overhead to the reconstruction operation.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 3A–3F illustrate the principles of decomposition and residual scaling as used in the present invention;

DESCRIPTION OF THE PREFERRED EMBODIMENTS

An image in a base and residual decomposition format, typified by the Photo CD™ format, can be sharpened as it is being reconstructed by scaling the spatial residuals before adding them to the interpolated image. This requires only one multiplication per pixel per residual to be scaled, generally totaling three or less to adequately sharpen an image. This can be further simplified if the spatial residual is encoded on the disk in some form of code, such as Huffman encoding. Instead of decoding the residual and then applying the scale to the decoded values, the decoding table can be modified to include the scale in the decoded values. This eliminates any extra operations required on a per pixel basis.

Figure 1:
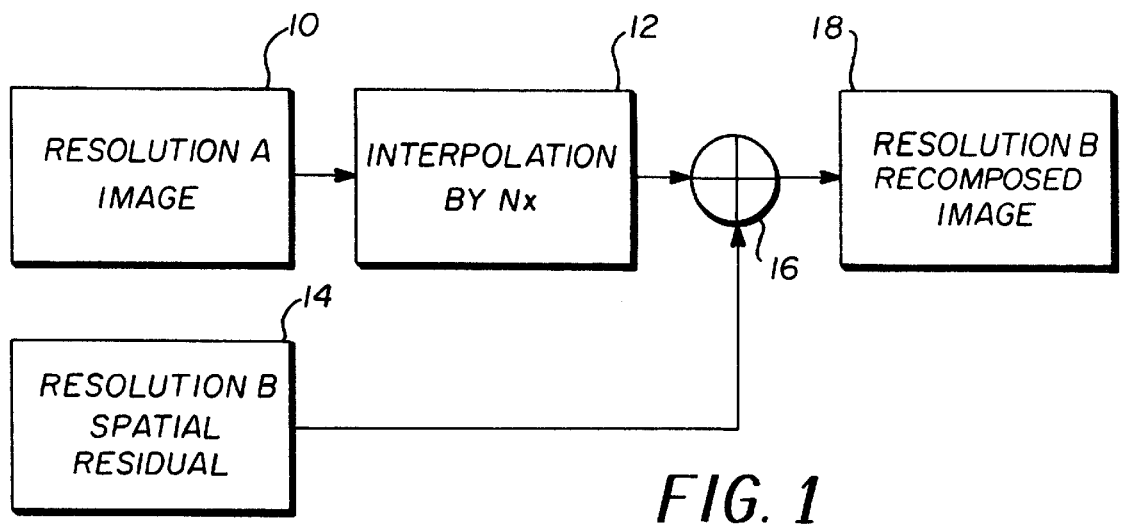
FIG. 1 illustrates reconstructing a high resolution image from a base image and a residual image.

To reconstruct a decomposed base/residual format image, such as a Photo CD image, at one resolution from the previous or lower resolution image, two steps are traditionally performed as illustrated in FIG. 1. First, a starting resolution A image 10, such as the Base image, is interpolated 12 to the size of the final image. Any other operations that results in increasing the image to the size desired could also be used. Next or in parallel therewith the spatial residuals 14 at the higher resolution B level, such as the 4 Base residuals of the image, are added 16 to the interpolated image to obtain a reconstructed resolution B image 18 having the frequency components at the residual B frequency level. If additional levels of residual image components exist for the image and a higher resolution image is desired, this operation is performed again with the resolution B image becoming the starting image and the next level of the residuals being the residuals used to reconstruct the next higher resolution image. Even though it is possible to have very many levels of residuals typically the decomposed image has a Base image, 4 Base residuals and 16 Base residuals. A typical Photo CD™ includes two levels of residuals for luminance and one for chrominance. Pro Photo CD™ includes an additional level of residuals for both luminance and chrominance.

Figure 2:
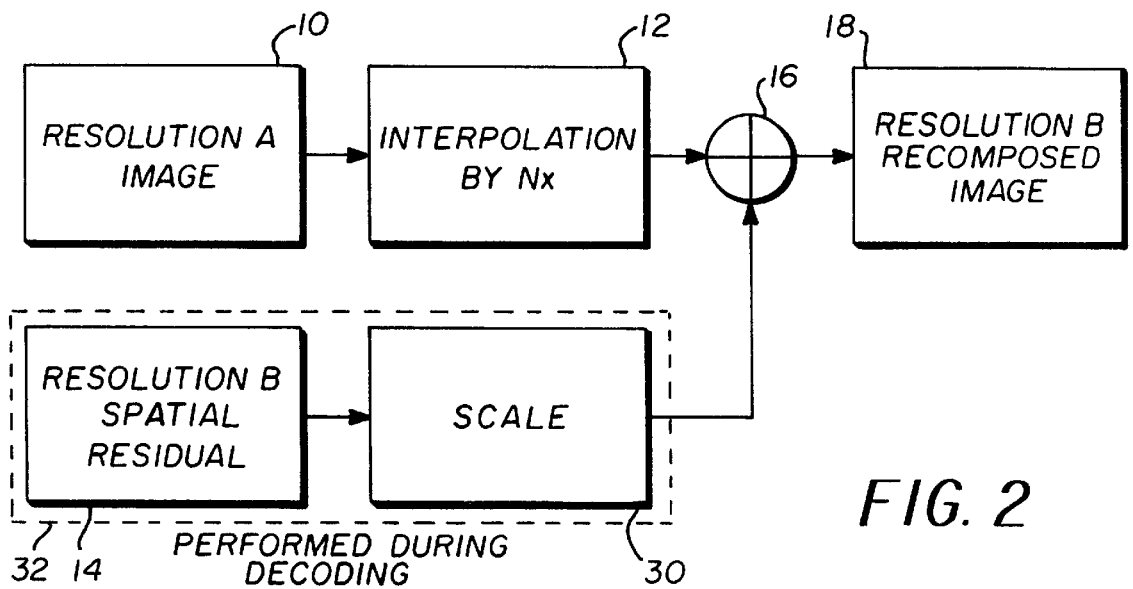
FIG. 2 illustrates a scaling reconstruction according to the present invention.

Since a spatial residual represents a band of frequency information (from the 0.25 to 0.5 of the Nyquist frequency of the final image), the image can be sharpened by simply scaling 30 each individual pixel in the spatial residual image before it is added to the interpolated image, as illustrated in FIG. 2. This scaling 30 can be done by multiplying each pixel by a constant value or by a non-linear value dependent on the residual value, or by developing a simple ID look-up table operation to map a single spatial residual value to a scaled residual value, where different residual values are scaled by fixed or different amounts. If the residuals themselves are encoded using an encoding scheme, such as the Huffman coding described in U.S. Pat. No. 5,227,789, the scaling can be combined with the table look-up decoding operation 32 (see FIG. 2) to provide the scaling without additional computational overhead. Since the residuals are boosted individually, different amounts of sharpening can be applied to the luminance and chrominance images and different amounts to different levels depending on the type of sharpening desired. The present invention will be described in more detail below with respect to FIGS. 3–9.

To better understand the present invention a description of the process of decomposing a simplified image, sharpening an image and scaling residuals will be discussed with respect to FIGS. 3A–3F.

Figure 3D:
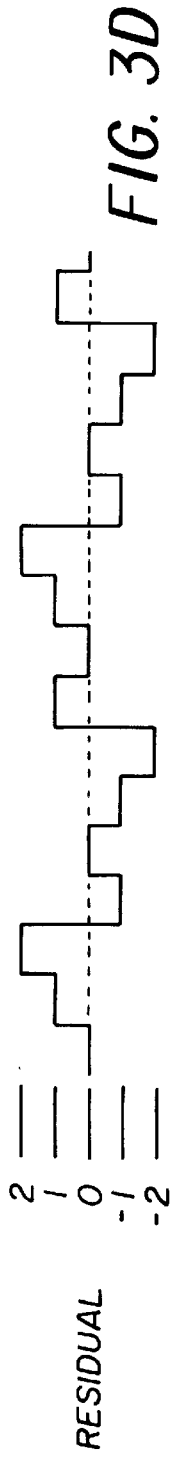

FIG. 3A illustrates a scan across a portion of an image that includes black and white stripes each a number of pixels wide. In producing the decomposed image from this original image the image is first decimated by two producing the pixel values as illustrated in FIG. 3B. This decimated image is then bi-linear interpolated to produce an image as illustrated in FIG. 3C. The interpolated image of FIG. 3C is then subtracted from the original image of FIG. 3A to obtain the decomposed residuals of FIG. 3D. The residuals along with the decimated image of FIG. 3B are respectively stored as the Base and decomposed residuals of the decomposed image. As can be seen by comparing FIGS. 3B, 3D and 3A, if the image residuals (FIG. 3D) are added to the decimated image (FIG. 3B) the original image (FIG. 3A) will be reconstructed.

Figure 3E:
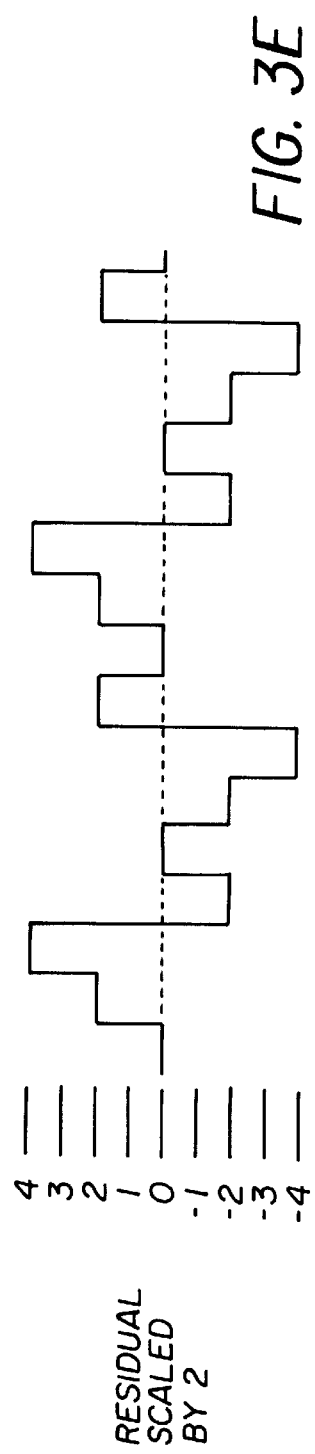
Figure 3F:
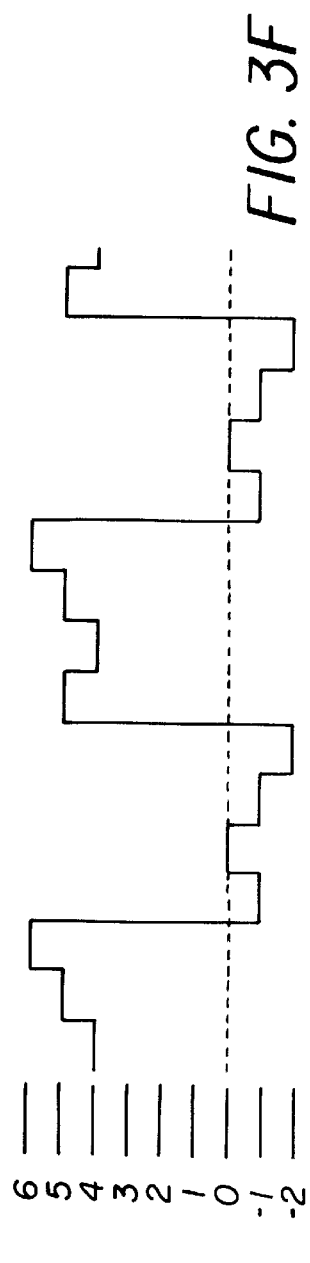

A sharpening process boosts the pixel values at an edge or at a sharp transition between pixel values. If the image of FIG. 3A is sharpened it may look like FIG. 3F where the transitions have been enhanced on both sides of the edge with greater enhancement preceding the edge. This can be accomplished by scaling the residuals by a constant, such as *2, as illustrated in FIG. 3E. When these scaled residuals are added to the decimated image of FIG. 3B the sharpened image of FIG. 3F results.

Figure 4:
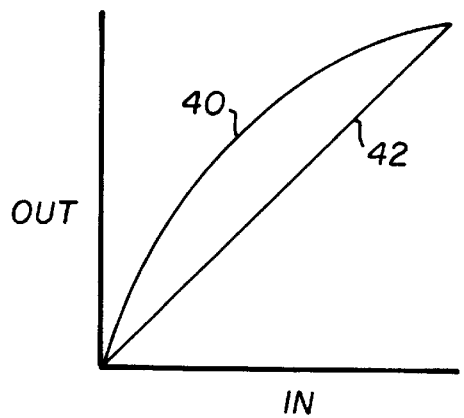
FIG. 4 depicts a scaling function.

In addition to scaling by multiplying by a constant, the scaling operation can also be performed by adding a constant to the residuals. It is also possible and in most cases preferred to have scaling controlled by a non-linear function 40, such as illustrated in FIG. 4, where the line 42 depicts a function that does not perform any scaling. Other sharpening functions converted into residual scaling functions can of course be used if desired.

Figure 5:
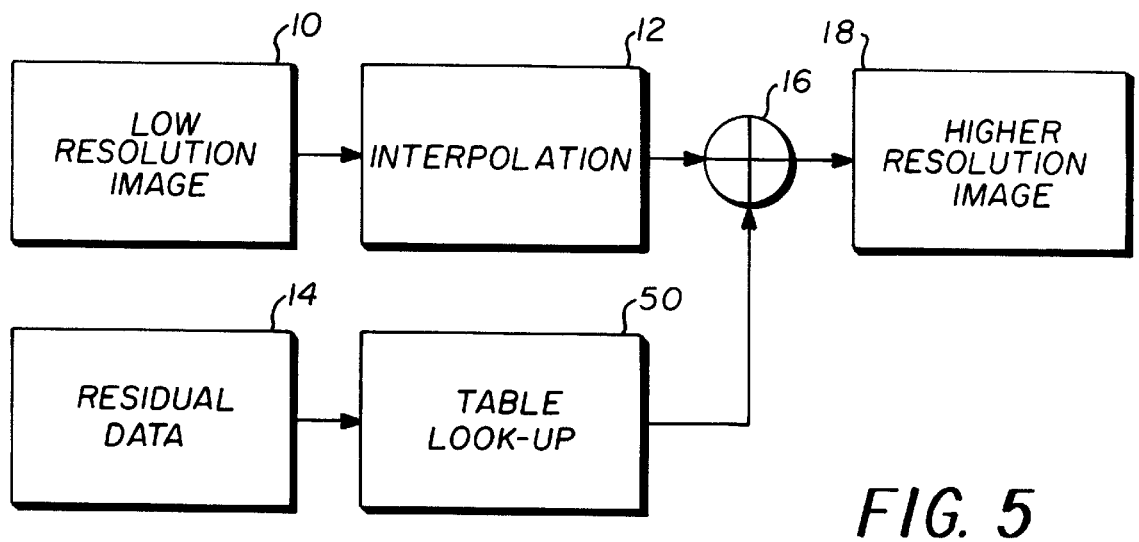
FIG. 5 illustrates scaling by table look-up.

The scaling by a constant, by a linear function or by a non-linear function is illustrated in FIG. 2. However, any scaling method that requires extra computational cycles of adding or multiplying is not preferred because of the extra added overhead of such operations. A better approach is illustrated in FIG. 5 where the residual data 14 being provided for the image is used as an indices into a table 50, such as a ROM table, in which the table entries are the scaled versions of the residuals and where the outputs of the table are added 16 to the interpolated image to produce the final higher resolution result. Table 1 below illustrates input residual values which are indices into the table 50 and the entries are the outputs of the table 50 where the residuals have been boosted by multiplying by a constant of 3.

TABLE 1

| Input residual value (signed) | Boosted residual value (signed) |
| --- | --- |
| −20 | −60 |
| −10 | −30 |
| −5 | −15 |
| −4 | −12 |
| −3 | −9 |
| −2 | −6 |
| −1 | −3 |
| 0 | 0 |
| 1 | 3 |
| 2 | 6 |
| 3 | 9 |
| 4 | 12 |
| 5 | 15 |
| 10 | 30 |
| 20 | 60 |

During operation a residual value of say −2 will be obtained for an image from a device, such as a CD ROM. The −2 residual value is used as an input to the ROM table 50 to access and output a boosted residual of −6 referenced by the −2 input. Table 1 only illustrates a small portion of a table that typically includes around 100 entries.

Figure 6:
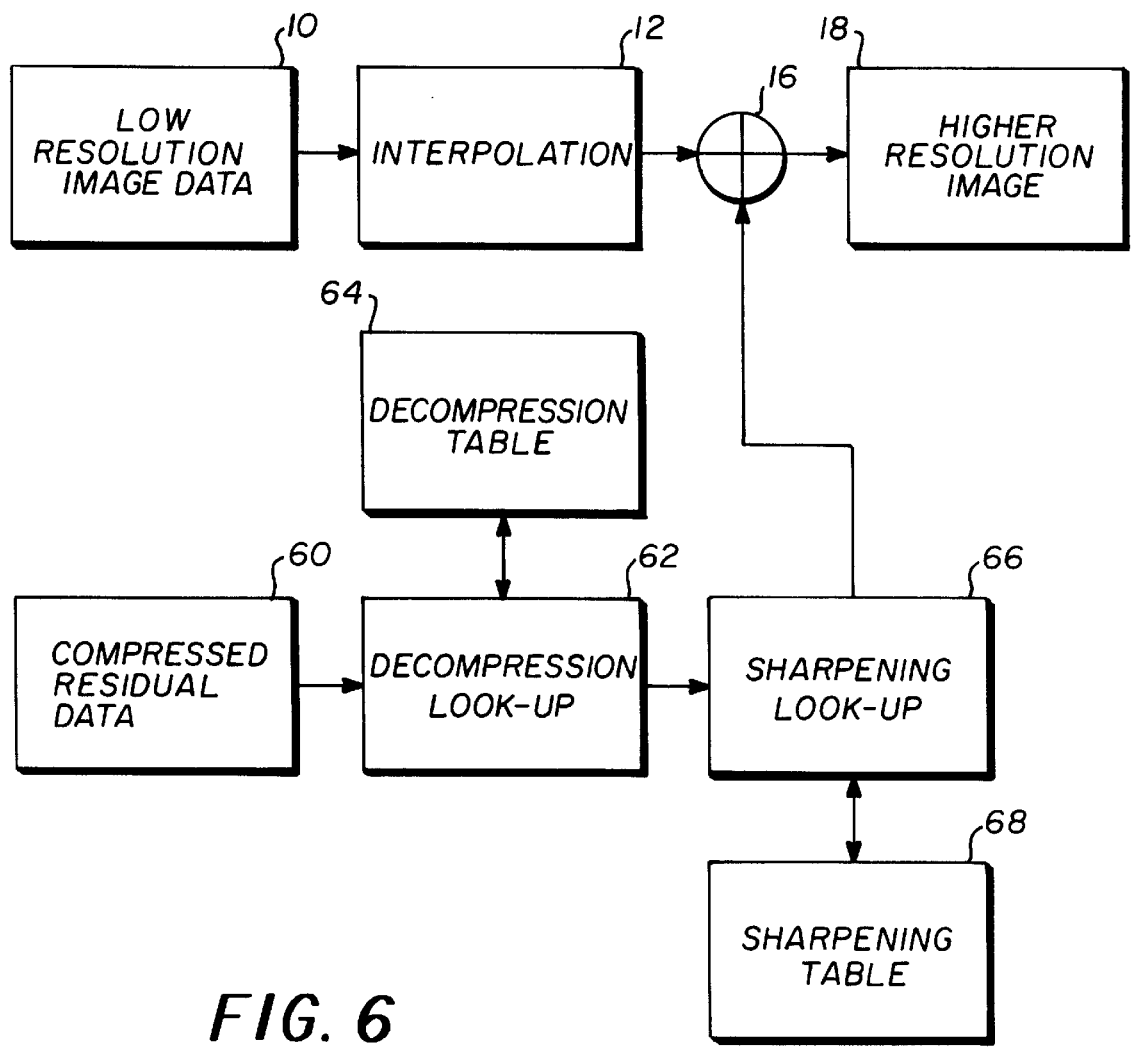
FIG. 6 shows decompression and scaling.

The approach of FIG. 5 can also be applied to the situation where the residuals have been encoded using an encoding scheme that compresses the residual data. This is illustrated in FIG. 6. In this method the compressed or encoded residual data 60 is used in a table look-up operation 62 to access a decompression data table 64 that outputs decompressed residual data. An example of a portion of such a table which Huffman decodes the input residuals is illustrated in Table 2 below.

TABLE 2

| Input Huffman stream (binary) | Residual value (signed) |
| --- | --- |
| 10010011X | −20 |
| 1001000X | −10 |
| 100101X | −5 |
| 10011X | −4 |
| 1000X | −3 |
| 010X | −2 |
| 101X | −1 |
| 00X | 0 |
| 011X | 1 |
| 110X | 2 |
| 1110X | 3 |
| 11110X | 4 |
| 111110X | 5 |
| 1111110X | 10 |
| 11111110X | 20 |

Note that X represents a string of any length since Huffman encoding uses only the first n bits of the input stream for decoding purposes. The residuals output by Table 2 (or 62 in FIG. 6) are used in a sharpening operation table look-up 66 to access a sharpening table 68, such as Table 1, which outputs scaled residuals. The approach of FIG. 6, along with the approach of FIG. 5, have drawbacks because the sharpening look-up operation 66 adds to the image reconstruction overhead. The operation can be further improved by the preferred method shown in FIG. 7.

Figure 7:
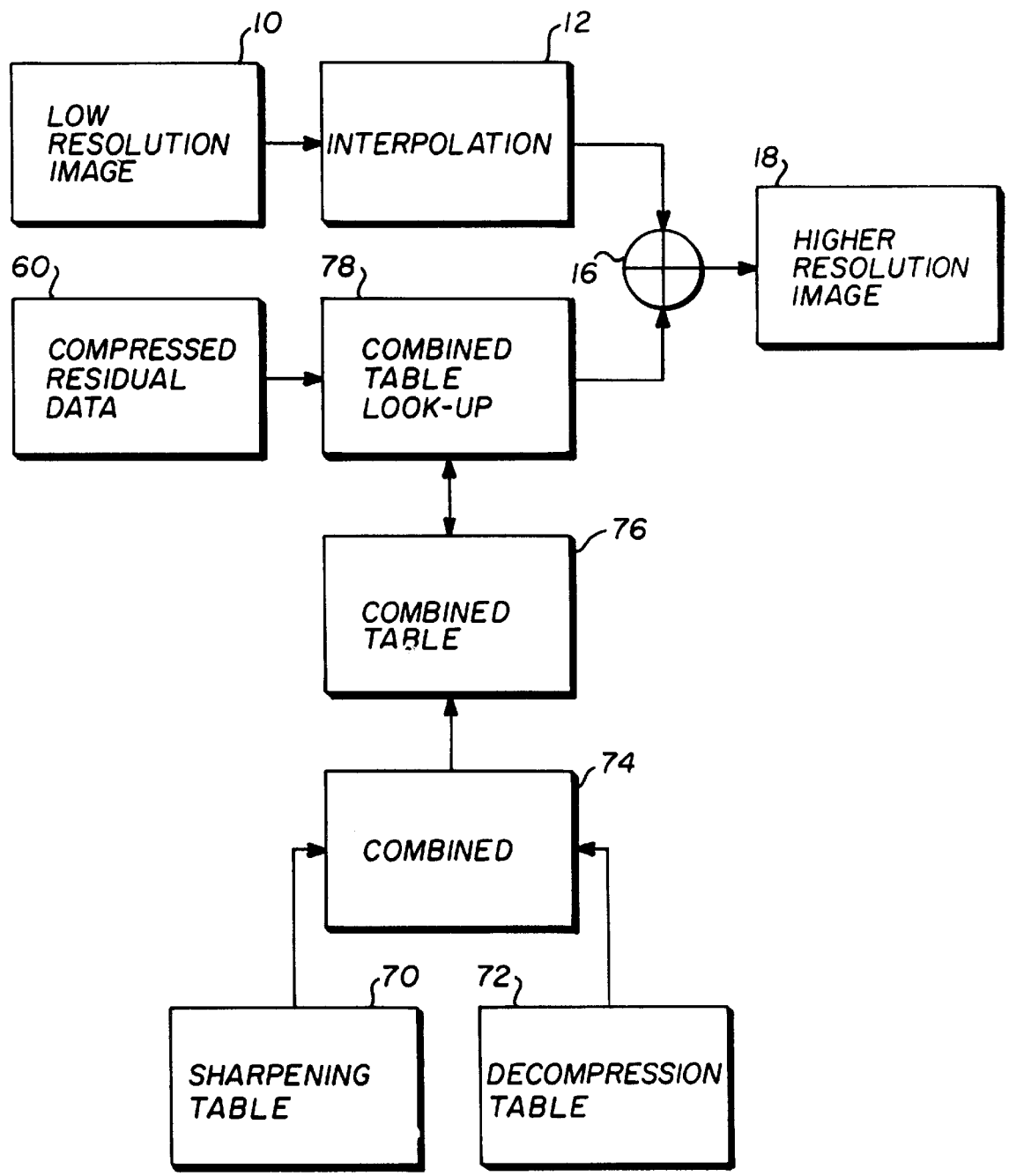
FIG. 7 illustrates combining decompression and scaling into a single operation.

In the approach shown in FIG. 7 the residual scaling table 70 and the decompression table 72 are combined in an off-line operation into a single combined table 76. An example of a portion of such a combined table is illustrated below in Table 3. Table 3 essentially combines Tables 1 and 2.

TABLE 3

| Input Huffman stream (binary) | Boosted residual value (signed) |
|---|---|
| 10010011X | −60 |
| 1001000X | −30 |
| 100101X | −15 |
| 10011X | −12 |
| 1000X | −9 |
| 010X | −6 |
| 101X | −3 |
| 00X | 0 |
| 011X | 3 |
| 110X | 6 |
| 1110X | 9 |
| 11110X | 12 |
| 111110X | 15 |
| 1111110X | 30 |
| 11111110X | 60 |

This table 76 is then used in the real time reconstruction of the higher resolution image 18 in a table look-up operation 78 which uses the compressed residuals as indices into the table 76 where the table entries and the outputs are decompressed and scaled residuals. This approach does not add any overhead to the decompression operation since there is still only one table look-up operation for each residual.

Since the Huffman table 72 is typically stored on the CD ROM, another approach is to load the Huffman table into computer system RAM. All the entries in this table are then scaled by a scaling function, such as multiplying by a constant, and the scaled entries are returned to the RAM table. The modified RAM table is then used as table 76. In this approach the single scaling and decoding table is created during the loading of the CD ROM containing images to be sharpened. This allows the sharpening constant to be changed for each CD or image.

Figure 8:
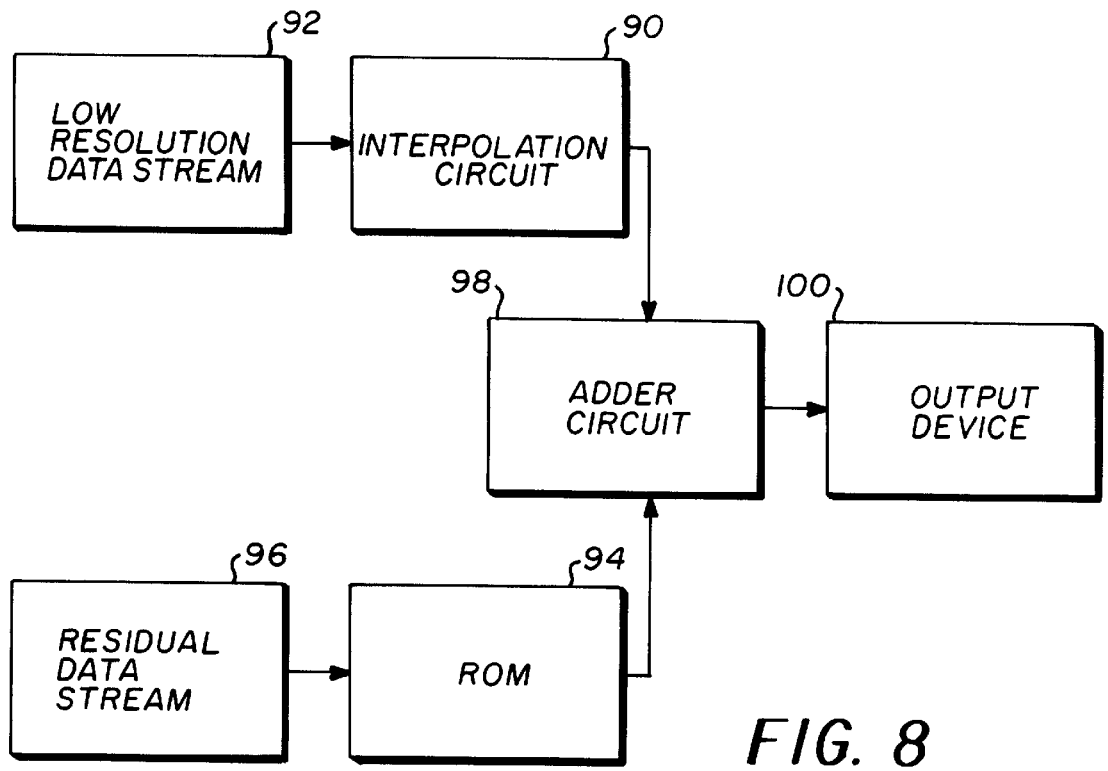
FIG. 8 illustrates dedicated components for performing the invention.
Figure 9:
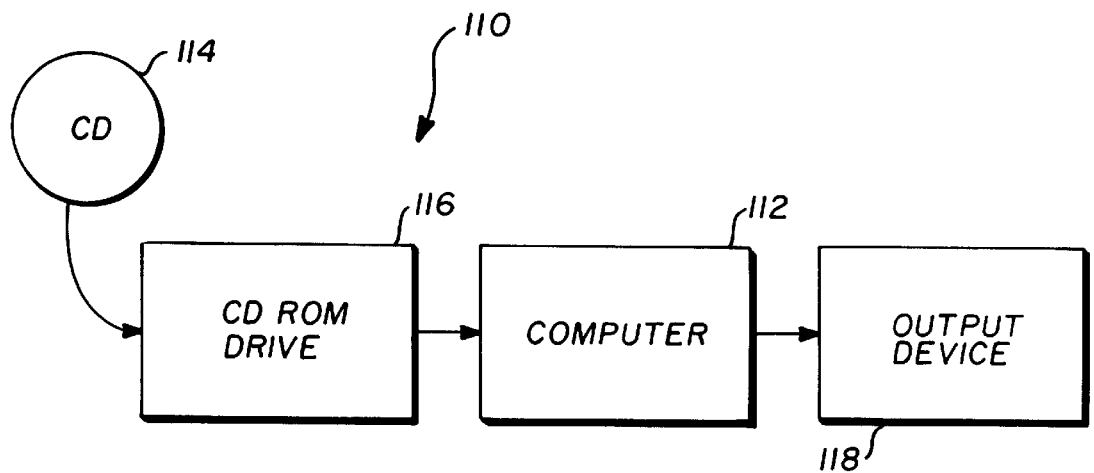
FIG. 9 depicts a computer system embodiment.

All of the operations of the present invention can be performed using dedicated hardware components as illustrated in FIG. 8, such that the interpolation 12 is performed by an interpolation circuit 90 interpolating an image data stream 92, table look-ups 78 are performed using a pipelined ROM 94 being addressed by a residual data stream and additions 16 are performed by an adder circuit 98 which supplies the data to an output device 100. It is also possible for the invention to be completely performed in software. However, the typical situation is where the operations are performed in a computer based system as illustrated in FIG. 9 and the operations are performed in mixed software/hardware operations. In the typical system 110, a computer 112, such as the computer that typically exists in a CD ROM player or that exists in a personal computer system, accesses a CD ROM 114 using a conventional CD ROM drive 116, retrieves the image data of the decomposed image, retrieves the table from the CD ROM, performs table look-ups and additions, and outputs the data to a conventional output device 118 capable of displaying color images, such as a CRT display or a printer, such as a thermal, laser or other light based technology printer.

Sharpening a base/residual decomposition image, such as a Photo CD™ image, by boosting the residuals as the image is reconstructed has advantages over the application of an FIR filter to the reconstructed image of the prior art. First, it is computationally much less complex. The algorithm to apply an FIR filter is very complex, requiring many lines of code, and much analysis to develop and optimize. The method of boosting the residual used in the present invention is very simple, working on the compressed data itself, requiring no extra operations to be performed on the image data, resulting in a significant performance increase. Because the image is pre-decomposed into frequency bands prior to reconstruction and sharpening, the user can get a much finer tuning of filter response (the frequency range to be sharpened) than could be achieved by a single FIR filter.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

REFERENCE NUMBER LIST

10 Resolution A image
12 Interpolation operation
14 Resolution B spatial residual
16 Addition operation
18 Resolution B recomposed image
30 Scaling operation
32 Combined scaling and decoding operation
40 Scaling function
42 Non-scaling function
50 Table look-up operation
60 Compressed residual data
62 Decompression look-up table
64,72 Decompression table
66 Sharpening table look-up operation
68,70 Sharpening residual table
74 Combining operation
76 Combined table
78 Combined table look-up operation
90 Interpolation circuit
92 Low resolution data stream
94 ROM
96 Residual data stream
98 Adder circuit
100 output device
110 Computer system
112 Computer
114 CD ROM
116 CD ROM drive
118 Output device

What is claimed is:

1. A method of sharpening, comprising:
   interpolating a first resolution image into an interpolated image of a size for a second resolution image of higher resolution than a resolution of the first resolution image;

scaling higher resolution decomposed residuals of the first resolution image; and combining the interpolated image and the scaled residuals to form a sharpened image of the second resolution.

2. A method as recited in claim 1, wherein the residuals are compressed and further comprising decompressing the residuals.

3. A method as recited in claim 2, wherein said scaling and decompressing are performed simultaneously.

4. A method as recited in claim 3, wherein said scaling and decompressing are performed using a table look-up operation.

5. A method as recited in claim 1, wherein said scaling uses one of a constant, a linear function and a non-linear function.

6. A method of sharpening an image stored in decomposed base/residual format where decomposed residuals are stored in a compressed format, comprising:

retrieving a base image and interpolating the base image to produce an interpolated image;

retrieving the decomposed residuals and performing a table look-up operation producing decompressed and scaled residuals by using a table having compressed residuals as indices and the decompressed and scaled residuals as entries where scaling is performed using a non-linear function; and adding the decompressed and scaled residuals to the interpolated image producing a sharpened image.

7. An image sharpening system, comprising:

means for producing an interpolated image from a base image;

means for scaling spatial decomposed residuals of the base image; and means for combining the interpolated and scaled spatial residuals into a sharpened image.

8. An image sharpening system, comprising:

means for interpolating an image;

a table comprising entries which decode and sharpen decomposed residuals of the image; and means for combining the interpolated images with the decoded and sharpened residuals.

9. A storage apparatus, comprising:

a read only memory;

an image component of a first spatial resolution stored in said memory;

a decomposed residual component of a second spatial resolution greater than the first resolution and stored in said memory; and a table including a scaled residual corresponding to the decomposed residual component and stored in said memory.

10. A method of image sharpening, comprising:

interpolating a first resolution image into an interpolated image of a size for a second resolution image of higher resolution than a resolution of the first resolution image;

scaling higher resolution residuals of the first resolution image where the residuals have additional spatial resolution and additional frequency content; and combining the interpolated image and the scaled residuals to form a sharpened image of the second resolution.

11. A storage apparatus, comprising:

a memory;

an image component of a first spatial resolution stored in said memory;

a residual component of a second spatial resolution greater than the first resolution and stored in said memory where the residual component has additional spatial resolution and frequency content; and a table including a scaled residual corresponding to the residual component and stored in said memory.

* * * * *